(12) United States Patent
Nelson et al.

(10) Patent No.: US 10,681,208 B2
(45) Date of Patent: Jun. 9, 2020

(54) PROVISIONING LOCATION INFORMATION SOURCED INDEPENDENTLY FROM COMMUNICATIONS NETWORK

(71) Applicant: Onvoy Spectrum, LLC, Boulder, CO (US)

(72) Inventors: Justin Nelson, Lyons, CO (US); Michael Remacle, Boulder, CO (US)

(73) Assignee: Onvoy Spectrum, LLC, Boulder, CO (US)

( * ) Notice: Subject to any disclaimer, the term of this patent is extended or adjusted under 35 U.S.C. 154(b) by 89 days.

(21) Appl. No.: 15/673,326

(22) Filed: Aug. 9, 2017

(65) Prior Publication Data
US 2018/0063323 A1     Mar. 1, 2018

Related U.S. Application Data

(60) Provisional application No. 62/372,673, filed on Aug. 9, 2016.

(51) Int. Cl.
| | |
|---|---|
| H04M 9/00 | (2006.01) |
| H04M 3/42 | (2006.01) |
| H04W 4/029 | (2018.01) |
| H04Q 3/00 | (2006.01) |
| H04W 4/02 | (2018.01) |

(Continued)

(52) U.S. Cl.
CPC ..... *H04M 3/42357* (2013.01); *H04M 3/5116* (2013.01); *H04Q 3/0045* (2013.01); *H04W 4/02* (2013.01); *H04W 4/029* (2018.02); *H04W 4/90* (2018.02); *H04M 2242/30* (2013.01); *H04Q 2213/13541* (2013.01)

(58) Field of Classification Search
CPC ........... H04M 3/42357; H04M 3/5116; H04M 2242/04; H04M 2242/30; H04W 4/90; H04W 4/02; H04Q 3/0029; H04Q 3/0045; H04Q 2213/13541
USPC ...... 455/404.2, 404.1, 445, 456.1; 379/142.1
See application file for complete search history.

(56) References Cited

U.S. PATENT DOCUMENTS

| | | | |
|---|---|---|---|
| 5,946,618 A * | 8/1999 | Agre | H04B 7/18539 455/428 |
| 2002/0037750 A1 | 3/2002 | Hussain et al. | |

(Continued)

FOREIGN PATENT DOCUMENTS

KR     1020130126527 A     11/2013

OTHER PUBLICATIONS

International Search Report, International Application No. PCT/US2017/046172, dated Nov. 20, 2017.

*Primary Examiner* — Danh C Le
(74) *Attorney, Agent, or Firm* — Davis Graham & Stubbs LLP

(57) ABSTRACT

Methods and architectures for improving operation of 9-1-1 and other emergency services networks. Enriched data (e.g., text messages, videos, phase II location information, etc.) may be transmitted to a PSAP via a secondary communication channel (i.e., data), wherein the primary communication channel is a voice telephony trunk. Disclosed embodiments may increase the speed with which accurate location information is made available to improve call routing accuracy and decrease dispatch time. Some embodiments may also enable continued operation of legacy emergency services systems during and after transition to next generation systems.

24 Claims, 10 Drawing Sheets

(51) Int. Cl.
 *H04M 3/51* (2006.01)
 *H04W 4/90* (2018.01)

(56) References Cited

U.S. PATENT DOCUMENTS

| | | |
|---|---|---|
| 2005/0259806 A1 | 11/2005 | Chang |
| 2006/0009190 A1* | 1/2006 | Laliberte ............ H04L 29/06027 |
| | | 455/404.1 |
| 2010/0087160 A1 | 4/2010 | Snapp et al. |
| 2011/0096769 A1 | 4/2011 | Sim |
| 2012/0027189 A1* | 2/2012 | Shaffer ............. H04M 3/42068 |
| | | 379/142.1 |
| 2015/0195857 A1* | 7/2015 | Pan ....................... H04W 76/10 |
| | | 455/41.3 |
| 2016/0227589 A1* | 8/2016 | Marshall ................. H04W 4/02 |
| 2016/0269534 A1* | 9/2016 | Roldan ............. H04M 1/72538 |
| 2017/0102700 A1* | 4/2017 | Kozak ................... B60W 30/00 |
| 2017/0286907 A1* | 10/2017 | Rizkallah ........... G06Q 10/0875 |
| 2019/0132903 A1* | 5/2019 | Suxena ................ H04W 76/50 |

* cited by examiner

PROVISIONING LOCATION INFORMATION SOURCED INDEPENDENTLY FROM COMMUNICATIONS NETWORK

RELATED APPLICATIONS

This application claims priority benefit of provisional U.S. Patent Application No. 62/372,673, filed Aug. 9, 2016, entitled "LOCATION PROVISIONING FOR CALL ROUTING", the entirety of which is hereby incorporated by reference.

FIELD OF THE INVENTION

The present invention relates generally to provisioning location information for mobile units, e.g., wireless units and nomadic VoIP units. The invention enables the provisioning of call routing information, at call time, based on mobile unit location and provides a VoIP solution that leverages existing mobile telephony resources. The technology can be used for handling emergency calls and in other location-based service contexts.

BACKGROUND

For many years, emergency call services have been implemented in Europe, North America and other jurisdictions. Generally, these emergency call services provide a 3-digit emergency number (e.g., 9-1-1 in North America and 1-1-2 in Europe) that can be used to connect emergency callers with appropriate public resources such as emergency responders. The goals of such systems generally include routing the emergency call to the appropriate call center (Public Safety Answering Point ("PSAP") in North America) for the location of the call, providing a call back number to the call center, and providing an accurate location to the call center to assist in dispatching.

Emergency call services were first deployed in wireline networks. Because wireline phones were essentially immobile, the caller's phone number could be readily used to look-up the location for the call. The location could be loaded into an automatic location information database ("ALI") by a local exchange carrier, a mobile switching office ("MSO"), or another party. That location could be used to route the call to the appropriate call center and to provide a location to the call center. More specifically, the phone number could be used both to query a routing database to obtain the emergency service number ("ESN") of the appropriate call center for routing the call through a selective router to the appropriate PSAP over telephony infrastructure (e.g., a time-division multiplexing ("TDM") trunk). The phone number could also be used to query the ALI using customer premise equipment ("CPE") at the PSAP, typically using E2 or PSAP to ALI message ("PAM") protocol. The ALI is generally queried after the call has been routed to the call center and the responsive ALI record (e.g., including a street address of the caller) can then be delivered to the call center and matched to the call taker who is handling that call such that the location information from the ALI may be displayed at the CPE. In this regard, the address may not arrive at the call center until well after the arrival of the call which may cause a delayed dispatching response.

As wireless telephones gained widespread adoption, the FCC (in the United States) required emergency services for wireless networks. This was implemented via a series of mandates addressing speed and accuracy of location information required for emergency calls with respect to both call routing and providing location information to call centers.

In this regard, a variety of sources of location information may be available. These may be categorized, for example, as cell antenna location information (National Emergency Number Association ("NENA") Phase I) and mobile unit location information (NENA Phase II). Cell antenna location information relates to the network equipment handling the call and includes cellID and cell sector information. For example, if a cell tower includes a three sector antennae, it may be possible to identify the sector handling the call, thereby locating the mobile unit to an area roughly corresponding to one-third of the geographic coverage area of the tower (ignoring geographical and radio interference issues). Mobile unit location information corresponds to determination of the actual location of the mobile unit, generally as geographical coordinates or a geocode. Methods for acquiring such Phase II data include network triangulation technologies (e.g., TDOA, AOA, strength of signal, etc.), satellite technologies (GPS, GNSS, etc.) and others.

More recently, the FCC (in the United States) has mandated emergency call services for VoIP, at least when bi-directional voice calls are supported. Such VoIP calls may be placed from a substantially immobile computer, mobile data unit, or VoIP phone. There are a number of difficulties relating to deployment of emergency call services for VoIP including locating the unit and call center compatibility. A number of technologies are available or under development for VoIP unit location including GPS, hotspot location, wireless triangulation, node mapping, and others. Call center compatibility remains a technological and practical impediment as many legacy call centers (i.e., legacy PSAPs such as those equipped for enhanced 9-1-1 ("E911")) are not equipped to handle VoIP calls.

Emergency call routing also remains problematic for mobile units including wireless units and nomadic VoIP units. As noted above, location is generally used twice in connection with an emergency call; coarse location (e.g., Phase I data) for routing and specific location (e.g., Phase II data) for dispatching. In VoIP contexts, it has been challenging to provision even coarse location at call time for routing to the appropriate call center. Even in wireless networks routing errors occur. In particular, call routing is generally executed based on communications network-based data, for example, antenna location and cell sector information. Cell sector boundaries do not always match call center boundaries and, for a variety of reasons, a call is not always handled by the closest call center. Moreover, if the call is routed to the wrong call center, the actual mobile unit location information (delivered later to the correct call center) may never reach the dispatcher. Many challenges thus remain for wireless and VoIP emergency service call handling.

Typically, VoIP calls are routed to a VoIP gateway or call server which sends a request to a VoIP positioning center ("VPC"). The VPC contains a database (e.g., a subscriber line database ("SLDB")) of known VoIP phone locations and associated uniform resource identifier ("URI") numbers which may have been manually entered by a network administrator, for example. The VPC may use the stored location information to determine an appropriate contingency resource number ("CRN") and PSAP for routing the call which are returned to the VoIP gateway. The VPC stores the automatic number identification ("ANI") and ALI for the VoIP phone and loads a shell record using pseudo-ANI ("p-ANI") into an ALI database while also mapping the p-ANI to the corresponding ANI. The call is sent to an emergency services gateway ("ESGW") by the VPC using the CRN (or emergency services routing number ("ESRN")) with the p-ANI. The ESGW connects the call to the appropriate selective router using the CRN (or ESRN). The selective router uses the ESN to route the call to the PSAP. Using pseudo-automatic number identification (p-ANI), the PSAP is able to query the VPC to obtain the ANI and ALI information stored for the relevant VoIP phone.

In a somewhat similar fashion, mobile 9-1-1 calls (e.g., those originating from mobile phones) are routed to a mobile switching center ("MSC"). The switching center may send the ANI of the device to a mobile positioning center ("MPC"). The MPC loads a shell record into an ALI database using a p-ANI that is specific to a PSAP. The shell record points the PSAP back to the MPC dynamic ALI database (e.g., one maintained by the carrier) for an actual address. The MPC or wireless provider may deploy a position determining entity ("PDE") for use with antenna towers. At call time, the PDE may send sector information or other location data to the MPC. The MPC may then map the p-ANI to the ANI and return an ESN to the MSC. Using the ESN, the MSC routes the call, based on the sector information, to a selective router with the p-ANI. The selective router delivers the call to the PSAP with the p-ANI information. The PSAP then queries a static ALI over E2 or PAM protocol for the record associated with the p-ANI. Based on the shell record, the PSAP (or the static ALI) may query the dynamic ALI of the MPC over E2 or PAM such that the MPC dynamic ALI may return the sector information to the PSAP. Upon subsequent requests from the PSAP ("re-bids"), the MPC may return more accurate location information as it becomes available over time. This process may cause delays in receipt of accurate location information at the PSAP.

In addition, emergency call handling systems are struggling to accommodate emerging technologies. As noted above, VoIP units are proliferating and some proposals for addressing emergency calls for VoIP units would entail substantial upgrades to call centers and other equipment. At the same time, many jurisdictions are moving towards deployment of next generation ("NG911") systems that may require changes to legacy call centers. More generally, there is a desire to accommodate texts, images, video and universal call-back number availability, as well as handling emergency calls from sensors and other automated systems, to improve call center functionality. All of these competing opportunities and interests have the potential to result in paralysis as it is unclear how to proceed with development of emergency call systems that meet the needs of emerging technologies in a cost-effective manner.

SUMMARY

The present invention is directed to provisioning location information and enhanced emergency services for mobile, VoIP, and mobile-VoIP units. For brevity, the term "mobile unit" as used herein may refer to any VoIP phone capable of being relocated, a cellular phone, a mobile device, etc. The invention enables use of actual unit location information (Phase II), not merely cell antenna location information (Phase I), for call routing. In this manner, mis-routed calls may be reduced and mobile unit location information is reliably provided to dispatchers. The invention also provides a system where mobile unit location information for VoIP calls can be provisioned to wireless routing centers. Existing infrastructure is thus leveraged to facilitate VoIP emergency call handling and improve emergency call routing for all mobile units. The invention also provides a universal solution for supporting VoIP, NG911, and legacy wireless emergency call systems as well as text, image, and video functionality in a cost-effective manner.

In accordance with one aspect of the present invention, a method is provided for provisioning location information in a communications network. A communications network may comprise a plurality of networks having various physical structures (e.g., antennas, wirelines, fiber optics, etc.) and utilizing various protocols (e.g., SIP, HLED, TDM, CDMA, etc.). The method involves obtaining mobile unit location information, separate from any wireless network cell antenna location information, for a mobile unit. In other words, the mobile unit may acquire location information from a source that is independent of the communications network used for routing a 9-1-1 call from the mobile unit. In the case where the mobile unit is a data network unit such as a VoIP unit, the first mobile unit location information may be dynamically determined based on one or more of hotspot location, satellite-based location technology, a beacon, a local IP connection, node mapping, or any other appropriate means of acquiring a location without reliance upon, for example, a cellular antenna or WiFi antenna used to place an emergency call. In this regard, the instant systems and methods may not rely upon a traditional PDE, cell tower triangulation, etc.

The method may further involve provisioning, substantially at call time, the mobile unit location information to a call routing center and operating the call routing center to route a call between the mobile unit and a call answering center (i.e., PSAP) using the mobile unit location information which has been obtained independently from the communications network infrastructure. Accordingly, mobile unit location information can be used for call routing (rather than just for subsequent dispatching) so as to improve call routing accuracy.

In one implementation, the mobile unit may be a data network unit and the call routing center may be adapted for routing emergency (or other) calls of other modalities, e.g., wireless telephony network calls. The call routing center can be any system adapted for such call routing. For example, protocols can be managed to enable VoIP emergency call handling by legacy selection routers of wireless networks so as to leverage existing resources and achieve immediate PSAP capability for VoIP calls and IP-based messaging. Provisioning the mobile unit location information can then involve interposing a VoIP positioning center between a VoIP gateway associated with the mobile unit and the call routing center and operating the VoIP positioning center to obtain the first mobile unit location information and provide the location information to the routing center. Specifically, a first path can be provided between the VoIP gateway and the routing center for communicating the call and a second path can be provided for communicating the mobile unit location information. At least a portion of the first path may implement TDM whereas the second path may be a data network pathway. The method may further involve transmitting a text message, a video message, or a data message between the mobile unit and the call answering center.

In accordance with another aspect of the present invention, certain functionality of emergency call handling systems, as well as non-emergency location-based services, is abstracted from underlying modalities and network topologies. In particular, location provisioning can be handled via universal (e.g., for VoIP, NG911, legacy wireless, etc.) platforms on a geographic basis that is independent of local jurisdictions and network subdivisions, e.g., on a nationwide basis. Such functionality may encompass the functionality of conventional emergency call routing functions ("ECRF") and emergency service routing proxies ("ESRP") as well as additional functionality. Location information may be obtained from, for example, the device, from networks, or from a third-party location provider. The location may then be provisioned to call routing centers (including legacy wireless), call centers, location-based service applications and the like. In this manner, emergency and non-emergency calls can be supported for various networks, architectures and protocols including NG911, legacy wireless, OTT, IP, TDM, hybrid IP/TDM, E2, PAM, SIP, LIS, REST, etc. In this manner, various stakeholders are insulated to an extent from the complexities of technology proliferation.

In accordance with a further aspect of the present invention, a method is provided for provisioning location information for a VoIP unit in a communications network. The method involves obtaining first mobile VoIP unit location information for a mobile VoIP unit and provisioning the mobile VoIP unit location information to a call routing center. In this regard, a VoIP positioning center may be interposed between a VoIP gateway and the call routing center so as to obtain the mobile unit location information and provide the information to the routing center. The location information can be used for routing and/or dispatching. In this manner, existing wireless telephony network structure is leveraged to facilitate the provision of emergency services for VoIP units.

In accordance with a still further aspect of the present invention, a system is provided for provisioning location information in a communications network. The system includes a positioning center, a call routing center, and a data network pathway interconnecting the positioning center and the call routing center. The positioning center obtains mobile unit location information, for example, based on hotspot location, a satellite-based location technology, or node mapping in the case of data network mobile units, or satellite-based location technology or network triangulation technology in the case of wireless network units. This location information can be provided to the call routing center substantially at call time via a data network pathway. The location information can then be used for call routing and/or dispatching in the case of emergency calls.

In accordance with an embodiment of the present invention, a method for use in provisioning location information in a communications network is disclosed. The method may include obtaining first mobile unit location information, separate from any wireless network cell antenna location information, for a mobile unit. In this regard, a mobile unit may receive location information from any appropriate source excluding, e.g., cell sector information as may be provided by a PDE. The method may further include provisioning, substantially at call time, said first mobile unit location information to a call routing center and operating said call routing center to route a call between said mobile unit and a call answering center using said first mobile unit location information.

In an aspect, said mobile unit may be a commercial mobile radio service (CMRS) compatible unit and said first mobile unit location information may be based on one or more of a network triangulation technology and a satellite-based location technology.

In another aspect, said mobile unit may be a data network unit and said first mobile unit location information may be based on one or more of hotspot location, a satellite-based location technology and node mapping.

In yet another aspect, said mobile unit may be a data network unit and said call routing center may be a selective router adapted for routing wireless telephony network calls, and said step of provisioning may comprise operationally interposing a positioning center between a Voice over Internet Protocol (VoIP) gateway associated with said mobile unit and said call routing center and operating said positioning center to obtain said first mobile unit location information and provide said first mobile unit location information to said routing center.

In another aspect, the method may include providing a first path between said VoIP gateway and said routing center for communicating said call (said first path may include at least a first portion implementing TDM, some other telephony protocol, a SIP channel, etc.), and a second path, separate from said first portion of said first path, between said VoIP gateway and said routing center, for communicating said first mobile unit location information.

In another aspect, said call routing center may be associated with multiple call answering centers and said step of operating may comprise matching said first mobile unit location information to a zone of one of said call answering centers and establishing a call channel between said first mobile unit and said one of said call answering centers.

In another aspect, the method may include providing second mobile unit location information for said first mobile unit, the same as or different from said first mobile unit location information, to said one of said call answering centers.

In yet another aspect, the method may include transmitting one of a text message, a video message, and a data message between said first mobile unit and said call answering center.

In accordance with another embodiment of the present invention, a method for use in provisioning location information in a communications network is described. The method may include obtaining first mobile unit location information for a VoIP mobile unit, provisioning said first mobile unit location information to a call routing center, wherein said mobile unit may be a data network unit and said call routing center may be adapted for routing wireless telephony network calls. The step of provisioning may comprise operationally interposing a positioning center between a VoIP gateway associated with said VoIP mobile unit and said call routing center. The method may further include operating said positioning center to obtain said first mobile unit location information and provide said first mobile unit location information to said routing center.

In an aspect, the method may include operating said call routing center to route a call between said mobile unit and a call answering center using said first mobile unit location information.

In another aspect, said first mobile unit location information may be obtained from a source external to a communications network through which an emergency call is routed from the VoIP mobile unit. For example, location information may be based on one or more of hotspot location, a satellite-based location technology, a location beacon, and node mapping.

In yet another aspect, the method may include providing a first path between said mobile VoIP unit and said routing center for communicating a call (said first path may include at least a first portion implementing time-division multiplexing (TDM)), and a second path, separate from said first portion of said first path, between said VoIP gateway and said routing center, for communicating said first mobile unit location information.

In another aspect, said call routing center may be associated with multiple call answering centers and said step of operating comprises matching said first mobile unit location information to a zone of one of said call answering centers and establishing a call channel between said first mobile VoIP unit and said one of said call answering centers.

In another aspect, the method may include providing second mobile VoIP unit location information for said first mobile VoIP unit, the same as or different from said first mobile unit location information, to said one of said call answering centers.

In another aspect still, the method may include transmitting one of a text message, a video message, and a data message between said first mobile VoIP unit and said call answering center.

In accordance with another embodiment of the present invention, a system for use in provisioning location information in a communications network is described. The system may include a positioning center for obtaining first mobile unit location information, separate from any wireless network cell antenna location information, for a mobile unit, a call routing center to route a call between said mobile unit and a call answering center using said first mobile unit location information, and a data network pathway for provisioning, substantially at call time, said first mobile unit location information to said call routing center.

In an aspect, said mobile unit may be a commercial mobile radio service (CMRS) compatible unit and said positioning center is operative to obtain said first mobile unit location information that is based on one or more of a network triangulation technology and a satellite-based location technology.

In another aspect, said mobile unit may be a data network unit and said positioning center is operative to obtain said first mobile unit location information that is based on one or more of hotspot location, a satellite-based location technology and node mapping.

In yet another aspect, said mobile unit may be a data network unit and said call routing center may be a selective router adapted for routing wireless telephony network calls, and said positioning center may be operatively interposed between a VoIP gateway associated with said mobile unit and said call routing center, wherein said positioning center may be operative to obtain said first mobile unit location information and provide said first mobile unit location information to said routing center.

In another aspect, the system may include a first path between said VoIP gateway and said call routing center for communicating said call, said first path including at least a first portion implementing TDM, and a second path, separate from said first portion of said first path, between said VoIP gateway and said routing center, for communicating said first mobile unit location information.

In yet another aspect, said call routing center may be associated with multiple call answering centers is operative for matching said first mobile unit location information to a zone of one of said call answering centers and establishing a call channel between said first mobile unit and said one of said call answering centers.

In another aspect still, said call routing center may be further operative for providing second mobile unit location information for said first mobile unit, the same as or different from said first mobile unit location information, to said one of said call answering centers.

In another aspect, said data network pathway may be further operative for transmitting one of a text message, a video message, and a data message between said first mobile unit and said call answering center.

DETAILED DESCRIPTION

Figure 1:
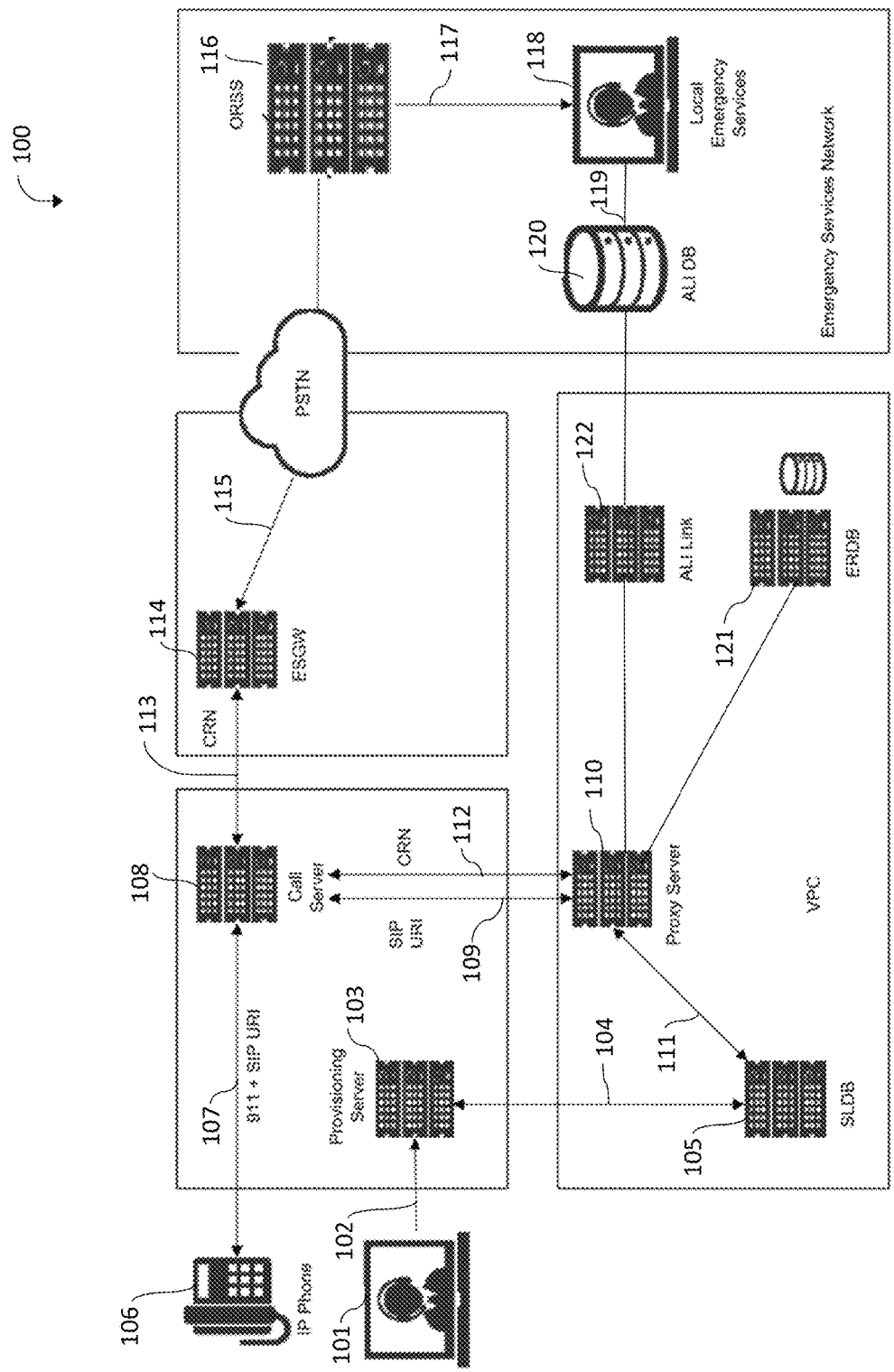
FIG. 1 illustrates a system for provisioning location information related to an IP device to a PSAP.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

FIG. 1 illustrates a system 100 for use in provisioning location information in a communications network serving a VoIP device. A user may access a workstation 101 to enter location information (e.g., street address) pertaining to the VoIP phone 106. The location information may be transmitted through channel 102 to provisioning server 103. It should be appreciated that the term "channel" as used herein may refer to any path, medium, protocol, etc. operable to provide the described functionality. Although some channels may be described as utilizing a particular protocol by way of example, any appropriate protocol may be utilized. Provisioning server 103 may transmit the location information to a subscriber line database ("SLDB") 105 of a VPC, where the location information may be stored in memory, via channel 104. Upon dialing an emergency service number (e.g., 9-1-1) from VoIP phone 106, the call may be routed via session initiated protocol ("SIP") channel 107 to call server 108. Call server 108 may send a uniform resource identifier ("URI") such as an ANI associated with VoIP phone 106 to proxy server 110 of the VPC. Proxy server 110 may then send a request to SLDB 105 via channel 111, in response to which SLDB 105 may send the location information associated with the URI to the proxy server 110. The proxy server 110, or another component of the VPC, may reference the location information against an emergency routing database ("ERDB") 121 to determine an appropriate contingency routing number ("CRN"), e.g., an ESRN. The CRN may then be returned to call server 108 via channel 112 (which may be the same or different than channel 109). Call server 108 may transfer the call and the CRN to an ESGW 114 of a VoIP carrier via channel 113. ESGW 114 may transfer the call to a public switched telephone network ("PSTN") via channel 115 to deliver the call to an operator routing support service ("ORSS") 116 of an emergency services network. ORSS 116 may transfer the call via channel 117 to a local representative 118 such as a dispatcher or operator for emergency response. The local representative 118, or the PSAP CPE associated therewith, may send a request for the location information via channel 119 to a local ALI 120 which, in turn, may transmit a request to ALI link 122 of the VPC. In response, the local ALI 120 may receive the location information. This system architecture may be particularly applicable in the case of a stationary VoIP device, however, it is particularly problematic in the case of a mobile VoIP device due the reliance upon manually entered and stored location information.

Figure 2:
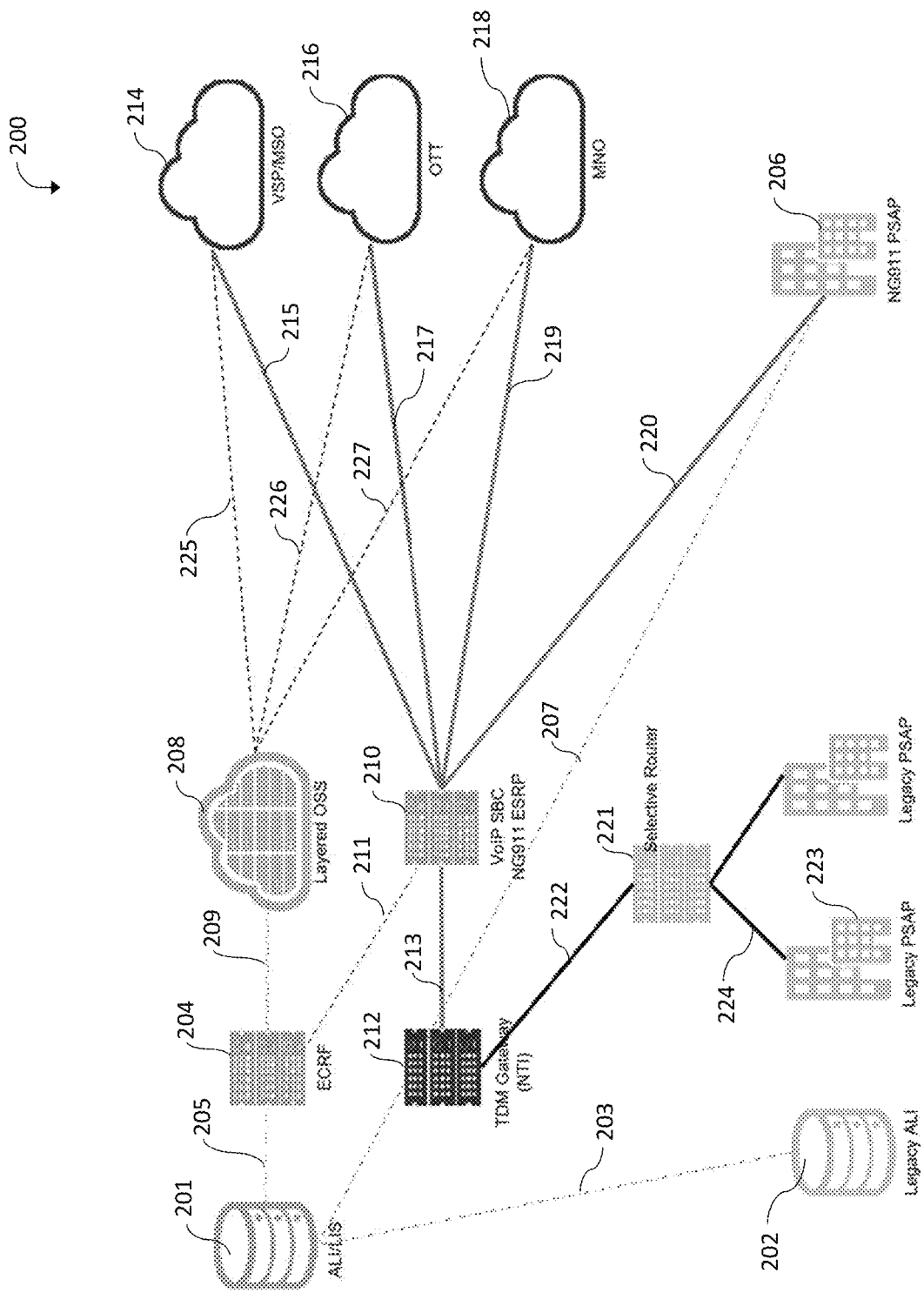
FIG. 2 illustrates a system architecture for provisioning emergency calls in accordance with an embodiment of the present invention.

FIG. 2 illustrates a system 200 for use in provisioning location information in a communications network. An ALI/local interconnect service ("LIS") database 201 (e.g., an NG911 ALI/LIS database) may be coupled to a legacy ALI 202 via an HTTP channel 203. The ALI/LIS database 201 may also be coupled to an emergency call routing function ("ECRF") 204 via an HTTP channel 205 and an NG911 PSAP 206 via an HTTP channel 207. ECRF 204 may be coupled to an Operations Support System ("OSS") 208 via an HTTP channel 209 and a VoIP session border controller ("SBC") NG911 emergency services routing proxy ("ESRP") 210 via an SIP channel 211. ESRP 210 may be coupled to a TDM gateway 212 via a real-time transport protocol ("RTP") channel 213. ESRP 210 may also be coupled to a plurality of service networks 214, 216, 218 (including but not limited to VoIP service provider ("VSP"), Over-the-top ("OTT"), and mobile network operator ("MNO"), as shown) via RTP channels 215, 217, and 219, respectively. ESRP 210 may also be coupled to the NG911 PSAP 206 via RTP channel 220. The TDM gateway may be coupled to legacy selective router 221 via TDM trunk 222 and the selective router may be coupled to at least one legacy PSAP 223 via a TDM trunk 224. The OSS 208 may be coupled to the service networks 214, 216, 218, via SIP channels 225, 226, and 227, respectively.

ECRF 204, which may be publically available, may provide routing instructions and VoIP SBC NG911 ESRP 210 may serve to replace selective routers. ESRP 210 may transition to mobile 9-1-1 functionality on a per call basis for PSAPs that are not NG911 compliant. This architecture is designed to support voice, text, video, and other enriched data.

Figure 3:
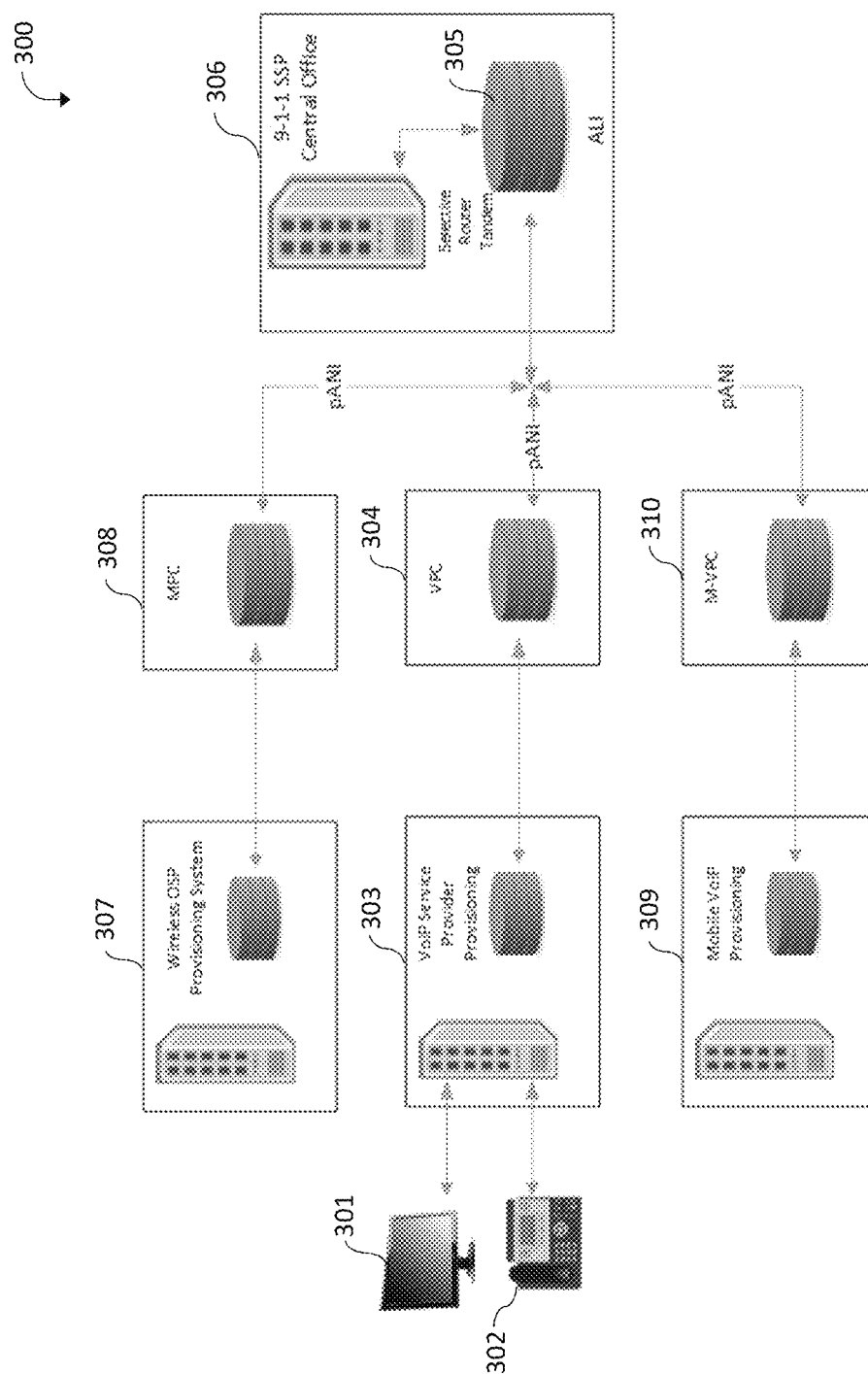
FIG. 3 illustrates a system for provisioning location information from multiple modalities to a central office.

FIG. 3 illustrates a system 300 for provisioning location information from multiple originating communication systems. A workstation 301 and a VoIP phone 302 may be operatively connected to a VoIP provisioning system 303. VoIP provisioning system 303 may be operatively connected to VPC 304 which is, in turn, operatively connected to 9-1-1 system service provide ("SSP") central office 306. More specifically, VPC 304 may be operatively connected to ALI 305 of the 9-1-1 SSP central office 306 for transmission of data (e.g., voice calls or location information) thereto. It should be noted that although the central office is described herein as being associated with a 9-1-1 SSP, this association is for explanation only and a facility housing a selective router and/or ALI database may be associated with an emergency services provider (e.g., 1-1-2).

A wireless outside plant ("OSP") provisioning system 307 may be operatively connected to an MPC 308 which is, in turn, operatively connected to ALI 305 and mobile VoIP provisioning system 309 may be operatively connected to M-VPC 310 which is, in turn, operatively connected to ALI 305. One or more p-ANIs may be utilized to establish communication between each positioning center and the ALI 305 (or the selective router associated therewith) such that location information from the various provisioning centers 304, 308, 310 may be stored at the ALI 305.

The system architecture of FIG. 3 enables implementation of 9-1-1 location services through mobile, VoIP, and mobile-VoIP system using a common infrastructure. Further explanation of the communication between the provisioning systems, positioning centers, ALI, and selective router are provided below in relation to FIGS. 4-6.

Figure 4:
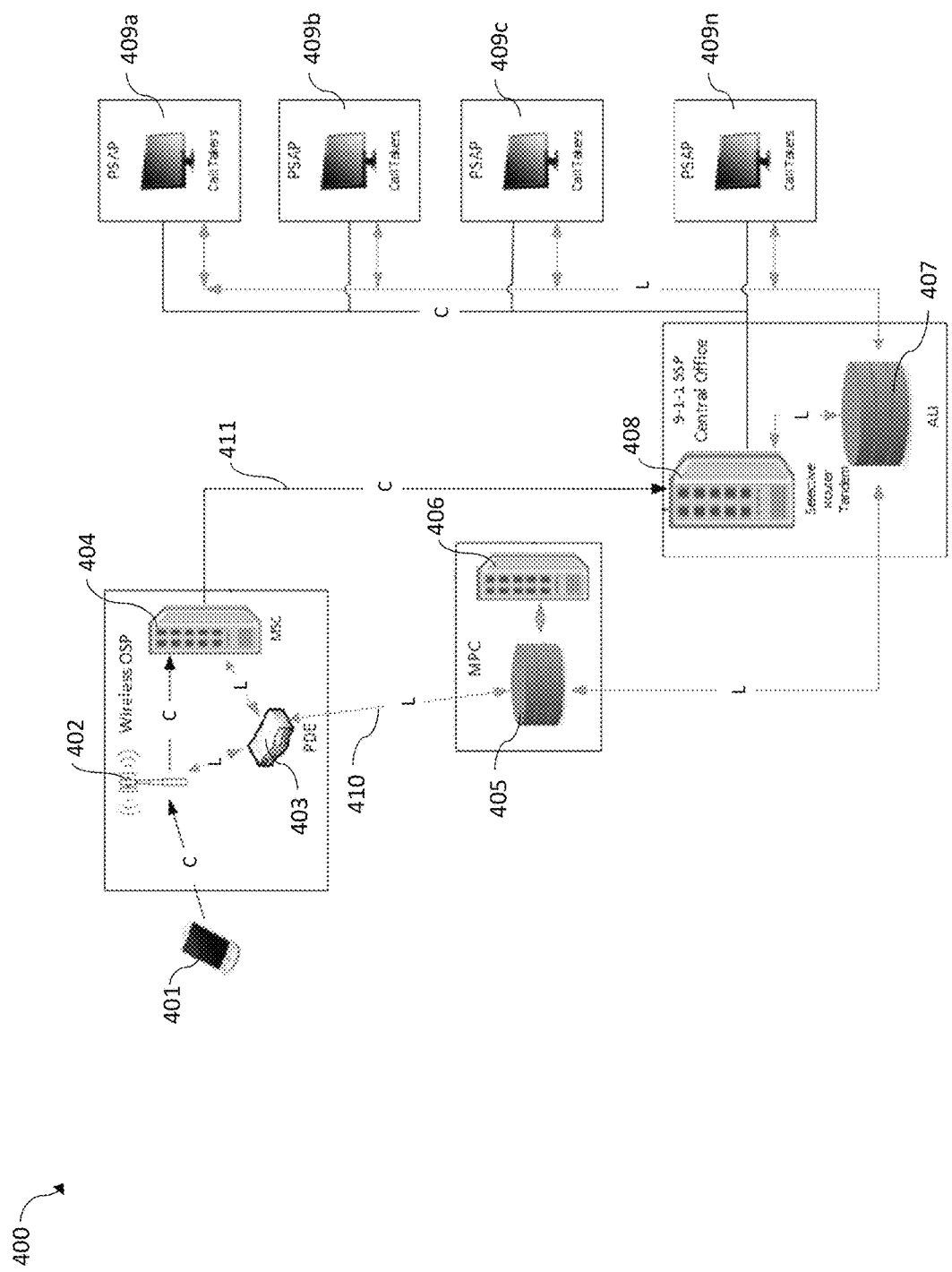
FIG. 4 is a block diagram of a system for provisioning location information from a wireless device to a PSAP.

FIG. 4 illustrates a system 400 for provisioning location information in a wireless network. An MPC may load a shell record with a p-ANI into ALI 407. Mobile unit 401 may place an emergency call via antenna tower 402. Antenna tower 402 may forward the call to mobile switching center ("MSC") 404. Antenna 402 may be in communication with PDE 403 to collectively determine location information 410 associated with the mobile unit 401. Notably, although the PDE 403 is illustrated as being connected directly to the antenna tower 402, it is contemplated that a PDE such as PDE 403 may be disposed in any appropriate location within the system. For example, PDE 403 may be disposed adjacent to and/or be in operative communication with the MPC. PDE 403 may also be in operative communication with MSC 404 regarding location information for selection of the appropriate selective router 408 for routing an emergency call. PDE 403 may transmit location information to dynamic ALI 405 of the MPC. The MPC may reference a database 406 to determine a PSAP associated with the location information. A CRN associated with the PSAP may be returned to the MSC 404 for forwarding the call 411 to the corresponding selective router 408. In some instances, an emergency call may be routed through the MPC prior to receipt at the selective router 408. Either the MPC or the PDE 403 itself may convert the location information from SIP or REST API and deliver it in the same manner as Phase II. In turn, the location information may be passed to ALI 407 of a 9-1-1 SSP central office. The call and location information may be routed to the PSAP 409*a-n* corresponding to the location information. Follow up location updates to the ALI 407 via SIP updates, customer updated LIS, or REST API may occur. Voice, text, and video may be supported by certain PSAPs.

It should be appreciated that in FIGS. 4-6*b*, certain channels of communication are indicated with an "L" for 'location' information while other channels are indicated with a "C" for 'call.' It should be appreciated that these indications are intended only to generally show paths of the voice data versus the location information. In some instances, other data may flow through these channels such as CRNs, ESRNs, PSAP numbers, etc.

Figure 5:
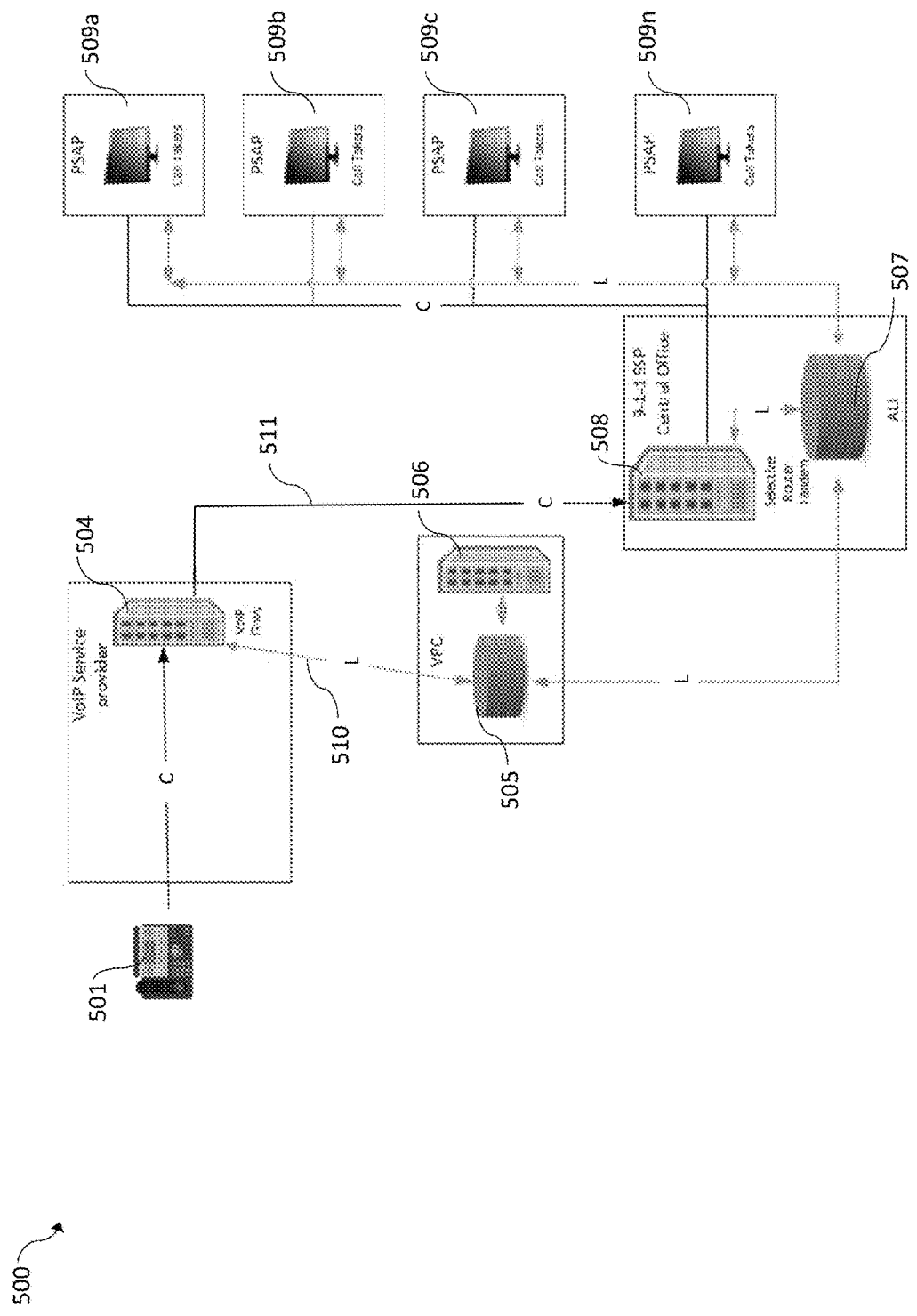
FIG. 5 is a block diagram of a system for provisioning location information from a VoIP device to a PSAP.

FIG. 5 illustrates a system 500 for provisioning location information in a VoIP network. VoIP phone 501 may place an emergency call via VoIP gateway 504 operated by a VoIP service provider, for example. VoIP gateway 504 may transmit location information 510 to database 505 of a VPC. The VPC may return an ESRN or CRN to VoIP gateway 504 to forward the call 511 to selective router 508. The location information may also be passed to ALI 507 of a 9-1-1 SSP central office and the call may be routed to a selective router 508 of the 9-1-1 SSP central office. The call and location information may be routed to a PSAP 509a-n corresponding to the location.

Figure 6A:
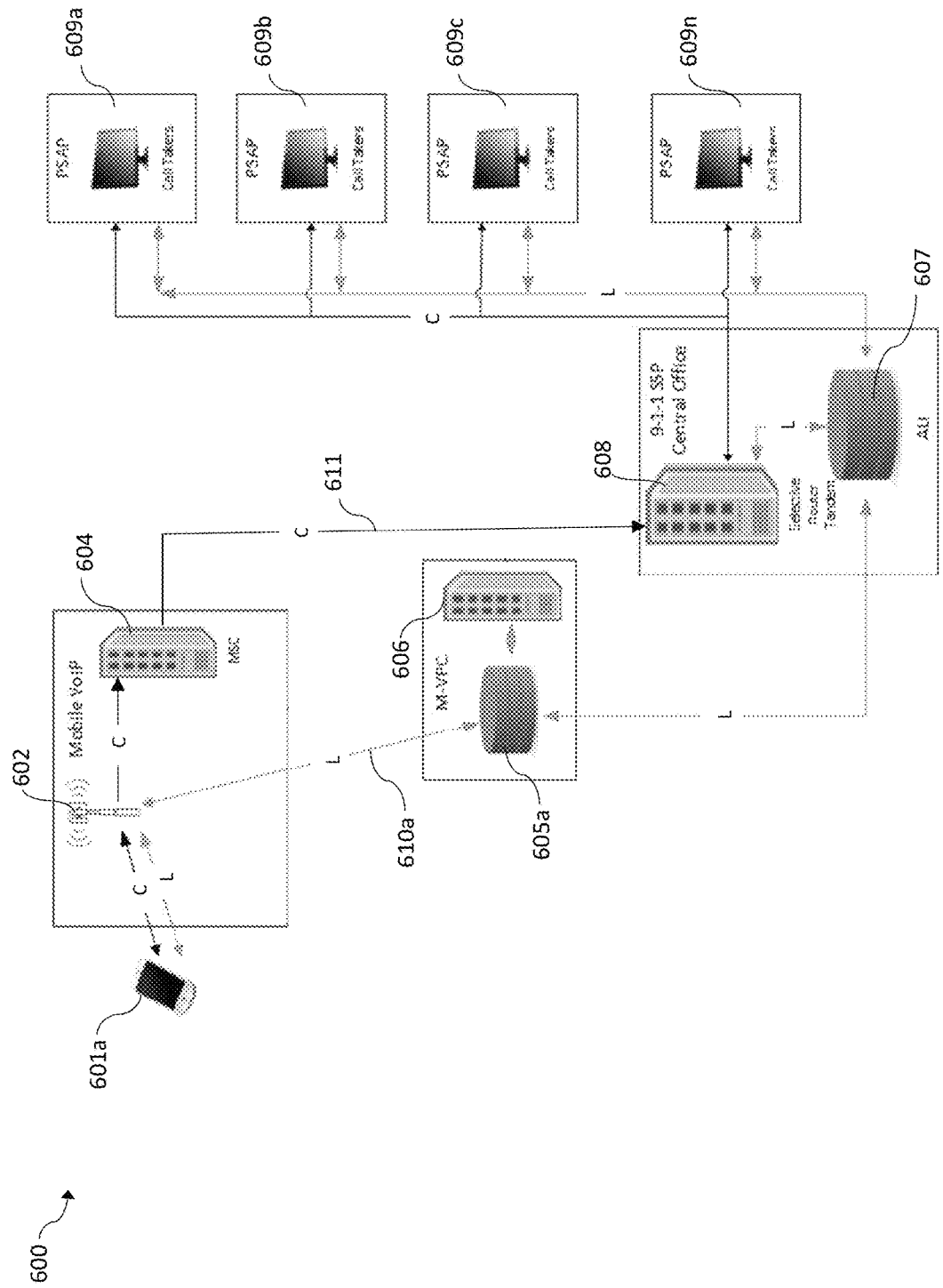
FIG. 6a is a block diagram of a system for provisioning location information from a mobile VoIP device to a PSAP.

FIG. 6a illustrates an embodiment of a system 600 for provisioning location information in a wireless VoIP network. Mobile unit 601a may place an emergency call 611 via antenna 602 (e.g., mobile network tower, WiFi antenna, hotspot, etc.). Antenna 602 may forward the call to MSC 604 and may send location information 610a received from the mobile unit 601a to database 605a of an M-VPC. It is also contemplated that the M-VPC may return location information to the MSC 604 for purposes of routing the call. For example, the M-VPC may house shape files which are compared against the location information to identify an appropriate selective router or PSAP. Additionally or alternatively, the M-VPC may send a p-ANI to MSC 604 for associating the call with a PSAP.

MSC 604 may forward the call to selective router 608 in some instances or may forward the call to server 606 of the M-VPC (this path not shown) in others. In the latter regard, location information and the call (which may be voice, text, video, etc.) may follow the same route through the network despite being separated into different channels. For example, in certain protocols (such as VoLTE), a single call path may comprise multiple bearer signals such as a signaling bearer and a voice bearer. In this regard, the voice call, text message, video, photo, etc. may be transmitted in the voice bearer while the location information is transmitted in the signaling bearer, or visa versa. Alternatively, a call may be transmitted using both the signaling and voice bearers while location information is transmitted using an additional, separate channel.

Location information 610a may be received at the mobile unit 601a though a channel independent of the communications network with which antenna 602 is affiliated. For example, the mobile unit 601a may be disposed within range of a beacon which transmits location information associated with a given locale. As one example, each floor of an office building may house a beacon which broadcasts the building address and floor number. In this regard, the mobile unit 601a may receive location information from a beacon within range (e.g., the beacon with the highest perceived signal strength) and forward that location information to the network antenna. As other non-limiting examples of sources of location information, mobile unit 601a may receive location information from a global positioning system, through a WiFi hotspot, an IP connection, node mapping, or any other source external to the antenna 602 and devices which may be associated therewith (e.g., a PDE).

The location information may be passed from the M-VPC to ALI 607 of a 9-1-1 SSP central office and the call may be routed to a selective router 608 of the 9-1-1 SSP central office. The call and location information may be routed to a PSAP 609 corresponding to the location information. It is contemplated that in some embodiments, a national (or other regional) 9-1-1 SSP central office may be implemented such that all emergency calls from MSC 604 are routed to a single selective router 608. In this regard, the call 611 and location information 610a may travel separate paths to the 9-1-1 SSP central office, at which point they are paired by the selective router 608 and/or ALI 607 before being transmitted to the appropriate PSAP via single or separate channels.

Figure 6B:
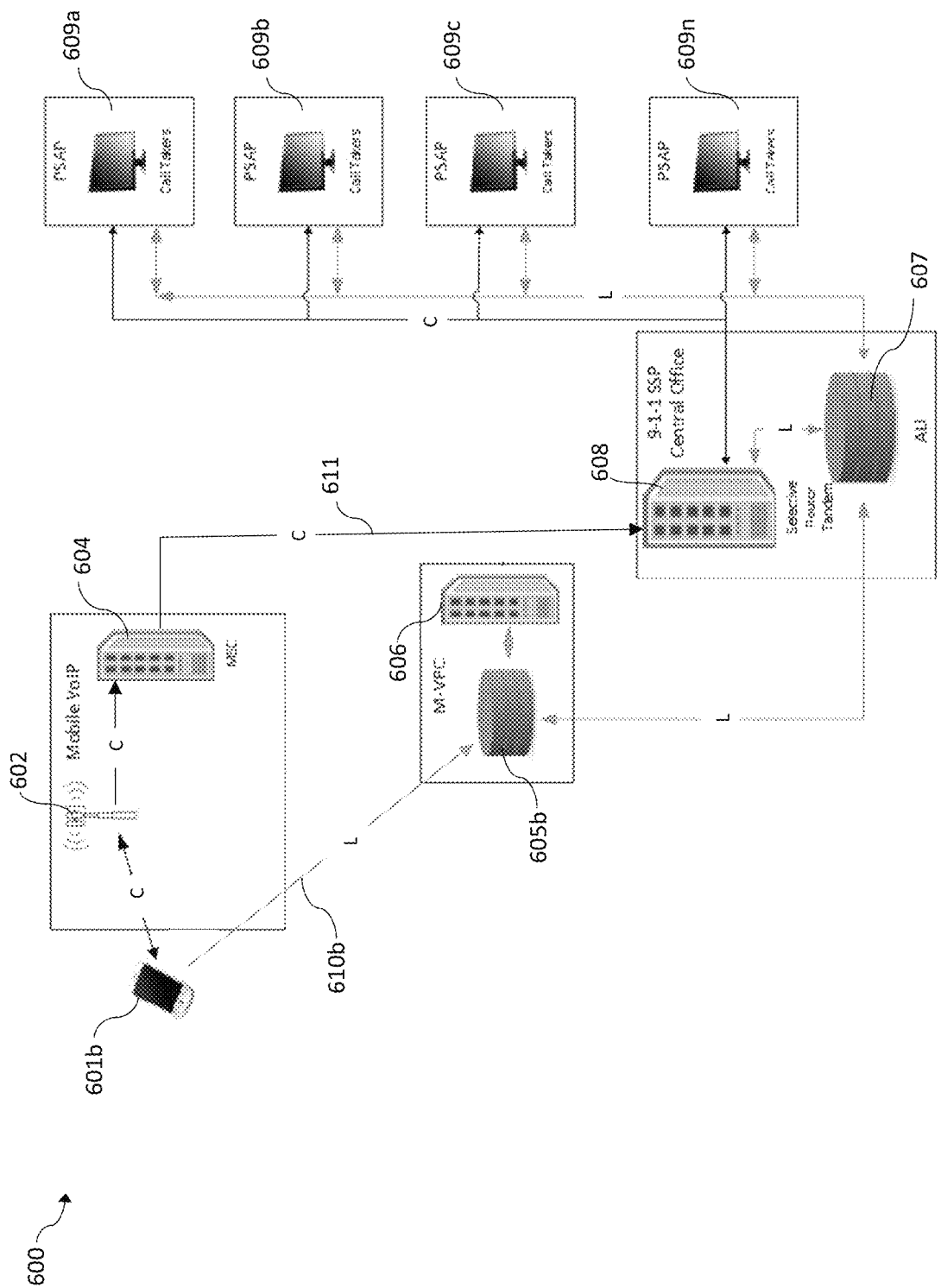
FIG. 6b is a block diagram of a system for provisioning location information from a mobile VoIP device to a PSAP.

FIG. 6a illustrates a system similar to that of FIG. 6b. However, mobile unit 601b may transfer location information 610b to database 605b of the M-VPC through a channel that omits antenna 602. In this regard, a call (e.g., voice call, text, photo, video, etc.) may be routed through the antenna 602 while location information is routed through another medium. For example, mobile device 601b may be disposed in an office building with access to a WiFi connection. Mobile device 601b may also have access to a mobile data network (e.g., LTE) associated with antenna 602. Call 611 may be routed through antenna 602 and the mobile data network while the location information 610b is routed through the WiFi connection to the M-VPC.

Figure 7:
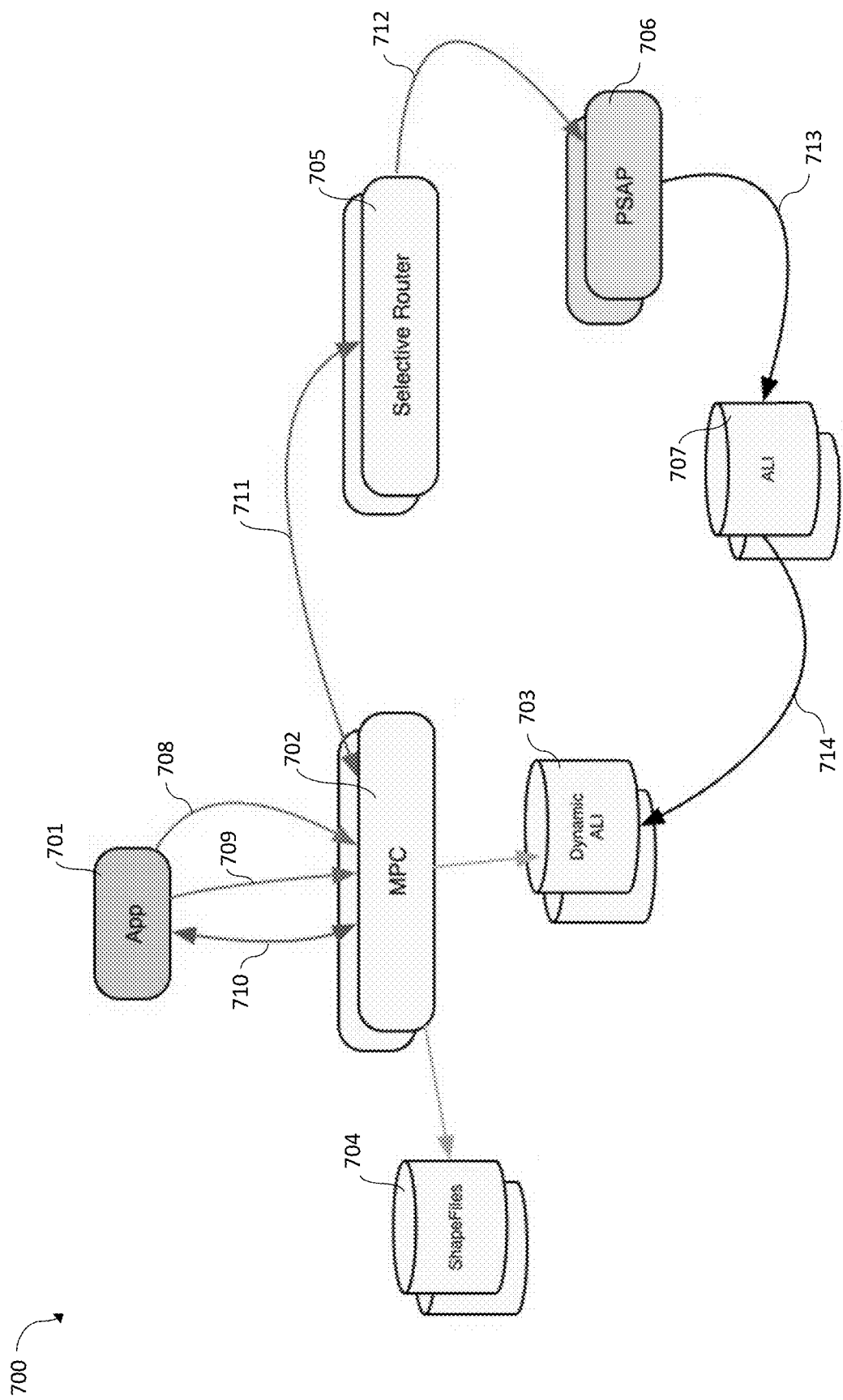
FIG. 7 is a block diagram illustrating the routing of information including text messages, images, and other voice and non-voice data from a mobile device to a PSAP.

FIG. 7 illustrates a system architecture 700 for routing information including text messages, images, accurate location information, and other voice and non-voice data from a mobile device to a PSAP. This architecture may enable non-voice data such as images, text messages, videos, etc. to be transferred to a PSAP equipped for legacy 9-1-1 (e.g., telephone voice data only) or enhanced 9-1-1 (e.g., telephone voice and location only). Location information for a device may be retrieved from an underlying operating system. This information may stem from a GPS receiver, WiFi connection, or any other integrated or remote device. In some instances in which a device is mobile, the location information may automatically be stored at regular intervals for retrieval as needed. For expediency, a preformed SIP header may be available for insertion into SIP client for communication via protocol 710. A direct HTTPS REST API may be used for location information and a simple API may be available for sending emergency text messages.

An application 701 operating on a mobile unit may utilize a plurality of communication protocols 708, 709, 710 to establish communication with a positioning center 702 (e.g., MPC, VPC, M-VPC, etc). Protocol 708 may be short message peer-to-peer ("SMPP") operable to transmit short messages. Protocol 709 may be HTTPS operable to transmit photographs, videos, documents, location information, etc. Protocol 710 may be SIP operable to transmit voice calls, video phone calls, instant messages, etc. It should be appreciated that the functionalities of these various protocols may overlap and fewer or more protocols may be utilized as necessary to provide the functionality of transmitting enriched data (i.e., more than just voice, phone number, and location). Positioning center 702 may access a database 704 to retrieve a shape file or other data useful for selection of an appropriate PSAP. Any enriched data which the PSAP is not equipped to receive through selective router 705 (e.g., phase II location information, photos, videos, etc.) may be transferred to dynamic ALI 703. A phone call or other communication may be routed from positioning center 702 to selective router 711 via trunk 711 (e.g., Centralized Automated Message Accounting ("CAMA"), signaling system no. 7 ("SS7")). The phone call may be routed with basic location information and/or the phone number associated with the mobile unit. Selective router 705 may route the phone call via trunk 712 (e.g., CAMA, SS7) to the appropriate PSAP 706, as identified by positioning center 702. The PSAP may access ALI 707 via Frame/IP channel 713. In response, ALI 707 may send a request to Dynamic ALI 703 via Frame/IP channel 714 to retrieve the enriched data deposited by positioning center 702. In this regard, the operator at PSAP 706 may have access to enriched data (sent by the caller) at substantially the same time that the call is received.

Alternatively, a phone call need not be placed by the user of the mobile unit. Rather, a text message or other indication of distress may be sent using application 701. In response, positioning center 702 may simulate a phone call to selective router 705 in order to initiate an emergency response from the PSAP 706 as if a call had been placed. In this regard, the simulated phone call may prompt the PSAP 706 to retrieve the text message or other enriched data from dynamic ALI 703. In this manner, a PSAP equipped only for E911 operation may be able to operate in a fashion similar to NG911.

Figure 8:
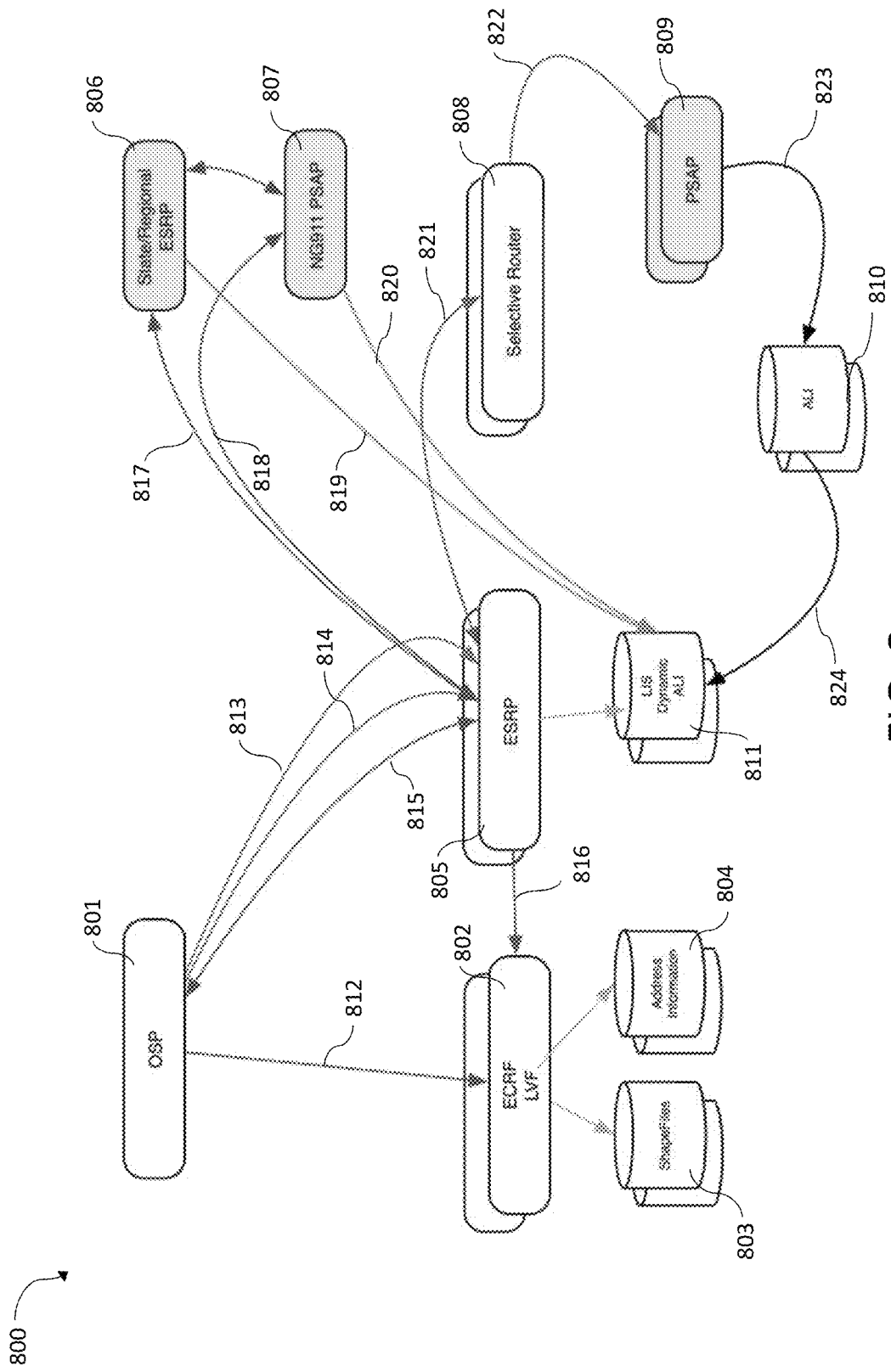
FIG. 8 is a block diagram illustrating the routing of information from a mobile device to a PSAP during transition to a nationwide ESRP.

FIG. 8 illustrates a system architecture 800 the routing of information from a mobile device to a PSAP, for example, during transition to a nationwide ESRP. OSP 801 may transmit data to ECRF/location validation function ("LVF") 802 using location-to-service translation ("LOST") protocol 812. OSP 801 may also communicate with legacy ESRP 805 via an SMPP protocol 813, an HTTPS protocol 814, and SIP 815. Legacy ESRP 805 may, in turn, transmit data to emergency call routing function/location validation function (ECRF/LVF) module 802 via LOST protocol 816. ECRF/LVF module 802 may be in operative communication with shape file database 803 and address information database 804. Legacy ESRP 805 may establish communication with National/Statewide/Regional ESRP 806 and NG911 PSAP 807, both of which are interconnected, via SIP 817, 818. ESRP 806 and NG911 PSAP 807 may retrieve enriched data from LIS dynamic ALI 811 via HLED 819, 820. Legacy ESRP 805 may be operable to update LIS dynamic ALI 811 with enriched data and location information. Legacy ESRP 805 may also be in operative communication with selective router 808 via trunk 821 (e.g., CAMA, SS7). In turn, selective router 808 may be in operative communication with legacy PSAP 809 via trunk 822, which in turn may retrieve information from legacy ALI 810 via Frame/IP 823. Legacy ALI 810 may retrieve enriched data from LIS dynamic ALI 811 via Frame/IP 824.

Figure 9:
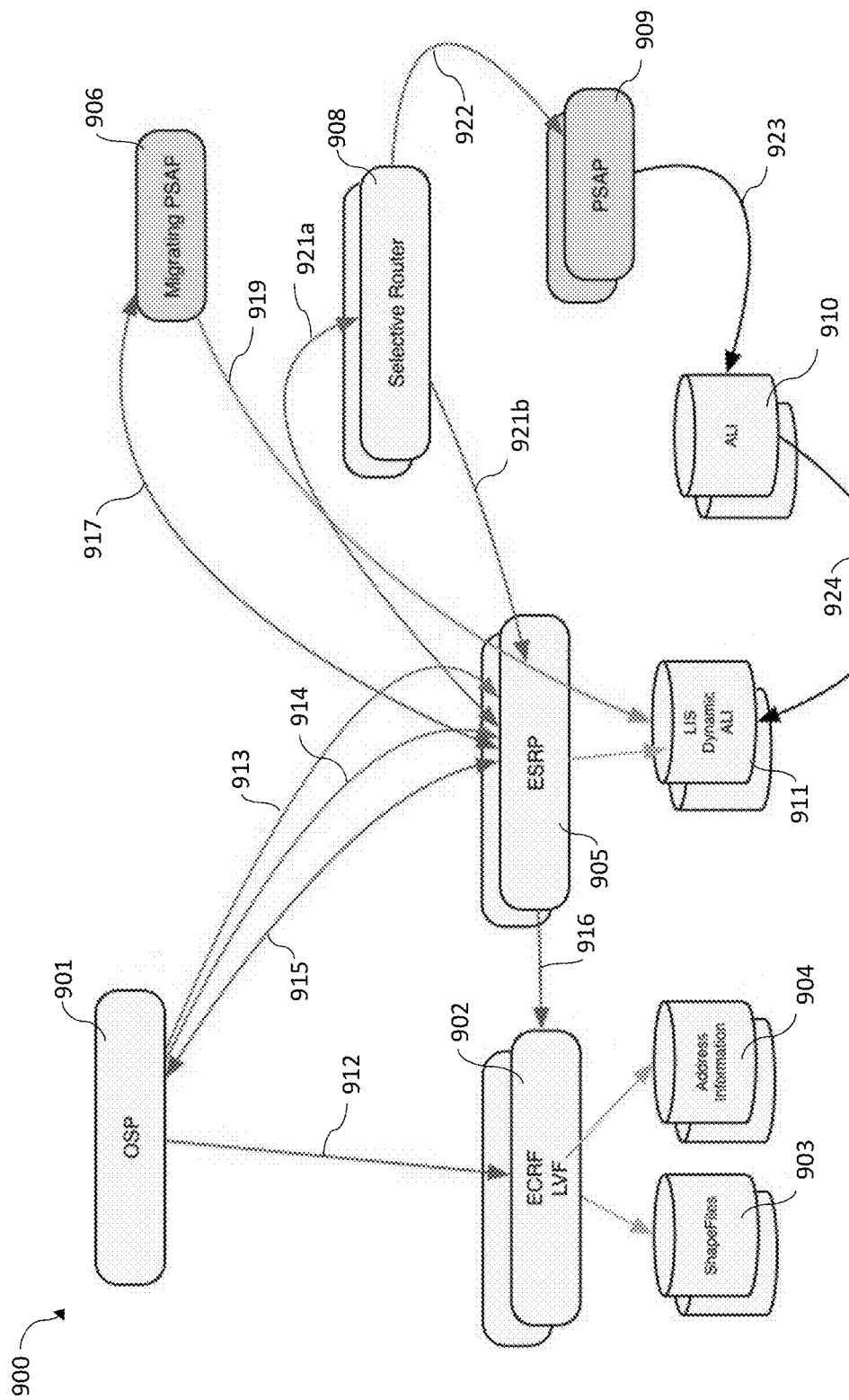
FIG. 9 is a block diagram illustrating the routing of information from a mobile device to a NG911 PSAP during migration from a legacy PSAP.

FIG. 9 illustrates a system architecture 900 for the routing of information from a mobile device to a NG911 PSAP in a transition state, e.g., during migration from a legacy PSAP. OSP 901 may transmit data to ECRF/LVF module 902 using a LOST protocol 912. OSP 901 may also communicate with ESRP 905 via an SMPP protocol 913, an HTTPS protocol 914, and SIP 915. ESRP 905 may, in turn, transmit data to ECRF/LVF module 902 via LOST protocol 916. ECRF/LVF module 902 may be in operative communication with shape file database 903 and address information database 904. ESRP 905 may establish communication with NG911 PSAP 906 via SIP 917. NG911 PSAP 906 may retrieve enriched data from LIS dynamic ALI 911 via HLED 919. ESRP 905 may be operable to update LIS dynamic ALI 911 with enriched data and location information. ESRP 905 may also be in operative communication with selective router 908 via trunk 921a (e.g., CAMA, SS7) and/or 921b. In turn, selective router 908 may be in operative communication with legacy PSAP 909 via trunk 922, which in turn may retrieve information from legacy ALI 910 via Frame/IP 923. Legacy ALI 910 may retrieve enriched data from LIS dynamic ALI 911 via Frame/IP 924.

During migration of a legacy PSAP to NG911, the existing selective router network may be leveraged. The routing of phone calls from a selective router 908 to a PSAP 909 may be based upon an ESN prior to the migration. During migration, the PSAP 909 may interoperate with ESRP 905 and LIS dynamic ALI 911 through an NG911 CPE. Upon completion of testing, the ESN may be redirected to a selective router trunk. Calls from legacy OSPs may route via their existing selective router access, but the call may be forwarded to ESRP 905. The ESRP 905 may then query the LIS dynamic ALI 911. As a fallback, the PSAP 909 may query static ALI 910. The ESRP may route the call to PSAP 906 over SIP 917.

During migration of an OSP to NG911, the OSP may be operable to deliver NG911 data to ESRP 905 via SIP 915 or through NENA i3. Selective router 908 may work in parallel with the ESRP 905. The legacy ALI 910 may be supported until the OSP migration is complete. Utilizing the architecture disclosed in relation to FIG. 9, a single PSAP may be able to migrate to NG911 on any selective router with MPC connectivity.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for use in provisioning location information in a communications network, comprising;
    obtaining first mobile unit location information, separate from any wireless network cell antenna location information, for a mobile unit;
    provisioning, substantially at call time, said first mobile unit location information to a call routing center, wherein said call routing center is associated with multiple call answering centers;
    operating said call routing center to route a call between said mobile unit and a call answering center using said first mobile unit location information, wherein said step of operating compromises matching said first mobile unit location information to a zone of one of said call answering centers and establishing a call channel between said first mobile unit and said one of said call answering centers; and
    providing second mobile unit location information for said first mobile unit, the same as or different from said first mobile unit location information, to said one of said call answering centers.

2. The method of claim 1, wherein said mobile unit is a commercial mobile radio service (CMRS) compatible unit and said first mobile unit location information is based on one or more of a network triangulation technology and a satellite-based location technology.

3. The method of claim 1, wherein said first mobile unit location information is obtained from a source external to a communications network through which the call is routed from the mobile unit.

4. The method of claim 3, wherein said mobile unit is a data network unit and said first mobile unit location information is based on one or more of hotspot location, a satellite-based location technology, a location beacon, and node mapping.

5. The method of claim 1, wherein said mobile unit is a data network unit and said call routing center is a selective router adapted for routing wireless telephony network calls, and said step of provisioning comprises:
    operationally interposing a positioning center between a Voice over Internet Protocol (VoIP) gateway associated with said mobile unit and said call routing center; and
    operating said positioning center to obtain said first mobile unit location information and provide said first mobile unit location information to said routing center.

6. The method of claim 5, further comprising:
    providing a first path between said VoIP gateway and said routing center for communicating said call, said first path including at least a first portion implementing TDM, and a second path, separate from said first portion of said first path, between said VoIP gateway and said routing center, for communicating said first mobile unit location information.

7. The method of claim 5, further comprising:
transmitting one of a text message, a video message, and a data message between said first mobile unit and said call answering center.

8. A system for use in provisioning location information in a communications network, comprising:
a positioning center for obtaining first mobile unit location information, separate from any wireless network cell antenna location information, for a mobile unit;
a call routing center to route a call between said mobile unit and a call answering center using said first mobile unit location information, wherein said call routing center is associated with multiple call answering centers and is operative for matching said first mobile unit location information to a zone of one of said call answering centers and establishing a call channel between said first mobile unit and said one of said call answering centers, wherein said call routing center is further operative for providing second mobile unit location information for said first mobile unit, the same as or different from said first mobile unit location information, to said one of said call answering centers; and
and a data network pathway for provisioning, substantially at call time, said first mobile unit location information to said call routing center.

9. The system of claim 8, wherein said mobile unit is a commercial mobile radio service (CMRS) compatible unit and said positioning center is operative to obtain said first mobile unit location information that is based on one or more of a network triangulation technology and a satellite-based location technology.

10. The system of claim 8, wherein said mobile unit is a data network unit and said positioning center is operative to obtain said first mobile unit location information that is based on one or more of hotspot location, a satellite-based location technology and node mapping.

11. The system of claim 8, wherein said mobile unit is a data network unit and said call routing center is a selective router adapted for routing wireless telephony network calls, and said positioning center is operatively interposed between a VoIP gateway associated with said mobile unit and said call routing center, wherein said positioning center is operative to obtain said first mobile unit location information and provide said first mobile unit location information to said routing center.

12. The system of claim 11, further comprising:
a first path between said VoIP gateway and said call routing center for communicating said call, said first path including at least a first portion implementing TDM, and a second path, separate from said first portion of said first path, between said VoIP gateway and said routing center, for communicating said first mobile unit location information.

13. The system of claim 8, wherein said data network pathway is further operative for transmitting one of a text message, a video message, and a data message between said first mobile unit and said call answering center.

14. A method for use in provisioning location information in a communications network, comprising;

obtaining first mobile unit location information, separate from any wireless network cell antenna location information, for a mobile unit wherein said mobile unit is a data network unit;
provisioning, substantially at call time, said first mobile unit location information to a call routing center, wherein said call routing center is a selective router adapted for routing wireless telephony network calls, and said step of provisioning comprises operationally interposing a positioning center between a Voice over Internet Protocol (VoIP) gateway associated with said mobile unit and said call routing center, and operating said positioning center to obtain said first mobile unit location information and provide said first mobile unit location information to said routing center;
operating said call routing center to route a call between said mobile unit and a call answering center using said first mobile unit location information; and
providing a first path between said VoIP gateway and said routing center for communicating said call, said first path including at least a first portion implementing TDM, and a second path, separate from said first portion of said first path, between said VoIP gateway and said routing center, for communicating said first mobile unit location information.

15. The method of claim 14, wherein said mobile unit is a commercial mobile radio service (CMRS) compatible unit and said first mobile unit location information is based on one or more of a network triangulation technology and a satellite-based location technology.

16. The method of claim 14, wherein said first mobile unit location information is obtained from a source external to a communications network through which the call is routed from the mobile unit.

17. The method of claim 16, wherein said mobile unit is a data network unit and said first mobile unit location information is based on one or more of hotspot location, a satellite-based location technology, a location beacon, and node mapping.

18. The method of claim 14, wherein said call routing center is associated with multiple call answering centers and said step of operating comprises matching said first mobile unit location information to a zone of one of said call answering centers and establishing a call channel between said first mobile unit and said one of said call answering centers.

19. The method of claim 14, further comprising:
transmitting one of a text message, a video message, and a data message between said first mobile unit and said call answering center.

20. A system for use in provisioning location information in a communications network, comprising:
a positioning center for obtaining first mobile unit location information, separate from any wireless network cell antenna location information, for a mobile unit wherein said mobile unit is a data network unit;
a call routing center to route a call between said mobile unit and a call answering center using said first mobile unit location information, wherein said call routing center is a selective router adapted for routing wireless telephony network calls, and said positioning center is operatively interposed between a VoIP gateway associated with said mobile unit and said call routing center, wherein said positioning center is operative to obtain said first mobile unit location information and provide said first mobile unit location information to said routing center;

and a data network pathway for provisioning, substantially at call time, said first mobile unit location information to said call routing center; and a first path between said VoIP gateway and said call routing center for communicating said call, said first path including at least a first portion implementing TDM, and a second path, separate from said first portion of said first path, between said VoIP gateway and said routing center, for communicating said first mobile unit location information.

21. The system of claim 20, wherein said mobile unit is a commercial mobile radio service (CMRS) compatible unit and said positioning center is operative to obtain said first mobile unit location information that is based on one or more of a network triangulation technology and a satellite-based location technology.

22. The system of claim 20, wherein said mobile unit is a data network unit and said positioning center is operative to obtain said first mobile unit location information that is based on one or more of hotspot location, a satellite-based location technology and node mapping.

23. The system of claim 20, wherein said call routing center is associated with multiple call answering centers is operative for matching said first mobile unit location information to a zone of one of said call answering centers and establishing a call channel between said first mobile unit and said one of said call answering centers.

24. The system of claim 20, wherein said data network pathway is further operative for transmitting one of a text message, a video message, and a data message between said first mobile unit and said call answering center.

* * * * *